(12) United States Patent
Stroila

(10) Patent No.: US 8,825,392 B2
(45) Date of Patent: Sep. 2, 2014

(54) MAP VIEW

(75) Inventor: Matei Stroila, Chicago, IL (US)

(73) Assignee: Navteq B.V., Veldhoven (NL)

( * ) Notice: Subject to any disclaimer, the term of this patent is extended or adjusted under 35 U.S.C. 154(b) by 475 days.

(21) Appl. No.: 13/173,518

(22) Filed: Jun. 30, 2011

(65) Prior Publication Data

US 2013/0006525 A1 Jan. 3, 2013

(51) Int. Cl.
*G01C 21/00* (2006.01)

(52) U.S. Cl.
USPC .......................... 701/454; 701/451; 701/458

(58) Field of Classification Search
CPC ........ G01C 21/26; G01C 21/30; G01C 21/32; G09G 5/00; G09G 5/001; G09G 5/12
USPC ......... 701/409, 412, 420, 436, 445, 446, 450, 701/451, 454, 458, 461, 468; 715/762–764; 345/628
See application file for complete search history.

(56) References Cited

U.S. PATENT DOCUMENTS

| | | | |
|---|---|---|---|
| 5,968,109 A | 10/1999 | Israni et al. | |
| 6,038,559 A | 3/2000 | Ashby et al. | |
| 6,278,942 B1 | 8/2001 | McDonough | |
| 6,526,352 B1 | 2/2003 | Breed et al. | |
| 6,714,861 B2 * | 3/2004 | Okude et al. | 701/458 |
| 6,734,849 B2 | 5/2004 | Dimsdale et al. | |
| 6,847,462 B1 | 1/2005 | Kacyra et al. | |
| 6,954,203 B2 | 10/2005 | Perry et al. | |
| 7,184,036 B2 | 2/2007 | Dimsdale et al. | |
| 7,215,430 B2 | 5/2007 | Kacyra et al. | |
| 7,376,510 B1 | 5/2008 | Green | |
| 7,580,045 B2 * | 8/2009 | Harrison et al. | 345/628 |
| 7,688,229 B2 | 3/2010 | Sula et al. | |
| 7,751,969 B2 * | 7/2010 | Jung et al. | 701/436 |
| 2006/0125828 A1 * | 6/2006 | Harrison et al. | 345/441 |
| 2006/0197763 A1 * | 9/2006 | Harrison et al. | 345/441 |
| 2008/0130955 A1 * | 6/2008 | Harrison et al. | 382/113 |
| 2008/0152216 A1 | 6/2008 | Meadow et al. | |
| 2010/0023250 A1 | 1/2010 | Mays et al. | |
| 2010/0128975 A1 * | 5/2010 | Prokhorov | 382/159 |
| 2010/0209013 A1 | 8/2010 | Minear et al. | |
| 2010/0250109 A1 | 9/2010 | Johnston et al. | |

OTHER PUBLICATIONS

"StreetSide: Dynamic Street-Level Imagery via Bing Maps." pp. 1-2. http://www.microsoft.com/maps/streetside.aspx (visited on Aug. 25, 2011).

Chicago map (Street View). Google maps, 1 page. http://maps.google.com/maps?pg=chicago+tribune&hl=en&cp=11&gs_id=k &xhr=t&g=chicago+map&gs_upl=&bav=on.2,or.r_gc.r_pw. &biw=1600&bih=981&wrapid=tlip13143062529932 10&um=1 &ie=UTF-8&hq= &hnear=0x880e2c3cd0f4cbed:0xafe0a6ad09c0c000,Chicagio,+IL &gl=us&ei=1LhWTpSu OsbjsQK5r7GQDA&sa=X&oi=geocode_result&ct=image&resnum=1 &sqi=2&ved=0CBoQ8gEwAA (visited on Aug. 25, 2011).

* cited by examiner

*Primary Examiner* — Richard Camby

(74) *Attorney, Agent, or Firm* — Lempia Summerfield Katz LLC

(57) ABSTRACT

One or more systems, devices, and/or methods for providing navigation-related functions, such as map display, are disclosed. For example, a method may include receiving input corresponding to a location. Photo image data associated with the location are retrieved. The photo image data are based on at least one image captured by a video camera or a photo camera. The photo image data are provided to display at least a portion of a photo image view representing at least a portion of the location. Map data corresponding to the location are retrieved. The map data are provided to display at least a portion of a digital map in the portion of the photo image view, and the digital map is integrated within the photo image view.

23 Claims, 9 Drawing Sheets

MAP VIEW

BACKGROUND OF THE INVENTION

The present invention relates to imagery, maps, and/or navigation and, more particularly, to providing imagery with maps or map data, such as for geographic and/or navigation functions.

Navigation and/or geographic systems or data thereof are used to help people travel or explore the world around them. For example, map views or imagery of different areas may provide useful guidance or geographic/location information. For example, one can view a map or geographical imagery to find his or her way to a destination or to view a desired point-of-interest ("POI").

As systems, devices, technologies, and/or user interfaces advance, people are given more options on how to view the world around them. However, technical limitations and inefficiencies may still exist. Accordingly, improvements and unique ways to provide and display representations of areas to users are desired.

SUMMARY OF THE INVENTION

According to one aspect, a method for providing navigation-related functions, such as map display, is provided. For example, the method includes receiving input corresponding to a location. Photo image data associated with the location are retrieved. The photo image data are based on at least one image captured by a video camera or a photo camera. The photo image data are provided to display at least a portion of a photo image view representing at least a portion of the location. Map data corresponding to the location are retrieved. The map data are provided to display at least a portion of a digital map in the portion of the photo image view, and the digital map is integrated within the photo image view.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
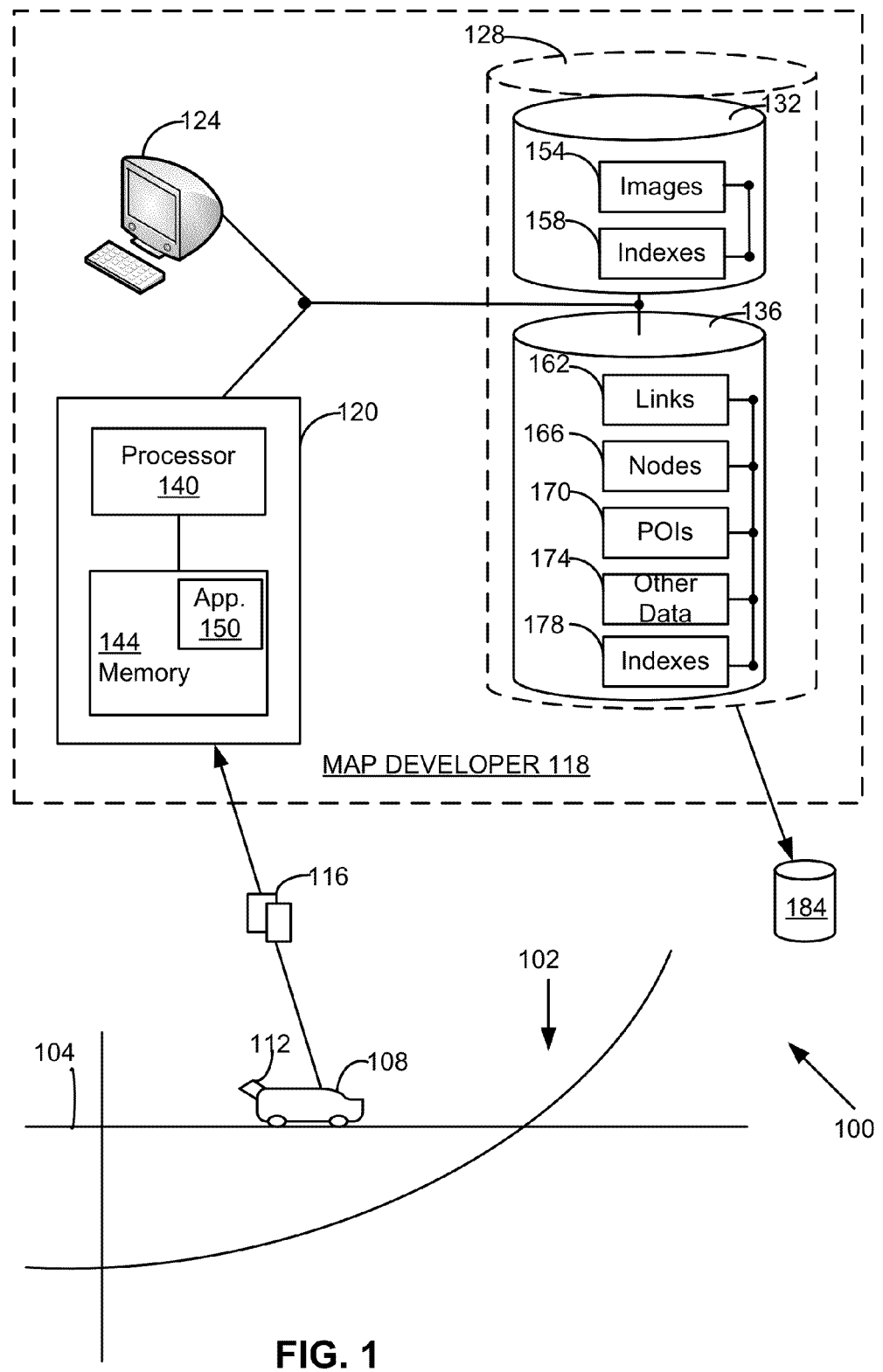
FIG. 1 is a diagram of an exemplary map, geographic, and/or navigation data system.

FIG. 1 shows one embodiment of a geographic, map, and/or navigation data system 100. The geographic, map, or navigation data system 100 includes, but is not limited to, an object 108 travelling on a path network 104 in a geographic region 102, a device 112, a processing device 120, a workstation or computer 124, and/or a database 128. Additional, fewer, or different components may be provided. For example, a proxy server, a name server, a map server, a cache server or cache network, a router, a switch or intelligent switch, additional computers or workstations, a user interface, administrative components, such as an administrative workstation, a gateway device, a backbone, ports, transmitter/receiver components, a network, network connections, and/or network interfaces may be provided. While the components in FIG. 1 are shown as separate from one another, one or more of these components may be combined. Also, a combined component may be separated into multiple components.

The object 108 is a vehicle, such as a car, truck, motorcycle, bicycle, Segway, or other transportation device or mechanical device used to move on the path network 104. Alternatively, the object 108 may represent a pedestrian, such as a human being or animal, that walks or moves along the path network 104. The path network 104 is a road network and/or a collection of other pathways. For example, the path network 104 is a road network made up of various roads. The roads may be used to drive vehicles on, such as local and neighborhood streets as well as highways. Also, instead of or in addition to traditional streets, the path network 104 may include bicycle roads or paths, walking paths, or other travel paths. Alternatively, the path network 104 may be an open area space with no specific, dedicated, or predetermined paths or travel constraints. The path network 104 is in the geographic region 102, such as a city, a suburb, a state, a country, and/or other geographic region.

The object 108 travels along or moves about the path network 104 to collect data. A supporting device or housing 112 is attached or connected with or carried by the object 108. The supporting device 112 may be or may include equipment to collect data representing an area about or around a road or path or other area. For example, the collected data may be imagery data, video/camera data (such as in the visible spectrum or other spectrum), laser data, light data (such as Light Detection and Ranging ("LIDAR") data), and/or other visual related or light based data. Other data such as location data, global positioning system ("GPS") data, and/or other geographic or position data may be collected.

In one embodiment, the supporting device 112 is a housing or container that is attached (such as removably attached or integrally attached) to or carried by the object 108. As the object 108 is on and/or moving on the path network 104 or portions thereof, equipment, such as a camera system and/or LIDAR device, in or on the supporting device 112 collects or gathers data corresponding to the surrounding area. Alternatively, the supporting device 112 may be one or more camera devices, LIDAR devices, and/or other devices or parts thereof. The supporting device 112 may be positioned at a top backend of the object 108 (such as a vehicle) and may be angled to enhance collection. In other embodiments, the supporting device 112 and/or equipment thereof may be positioned in any one or more places on or in the object 108 in any direction.

Figure 2:
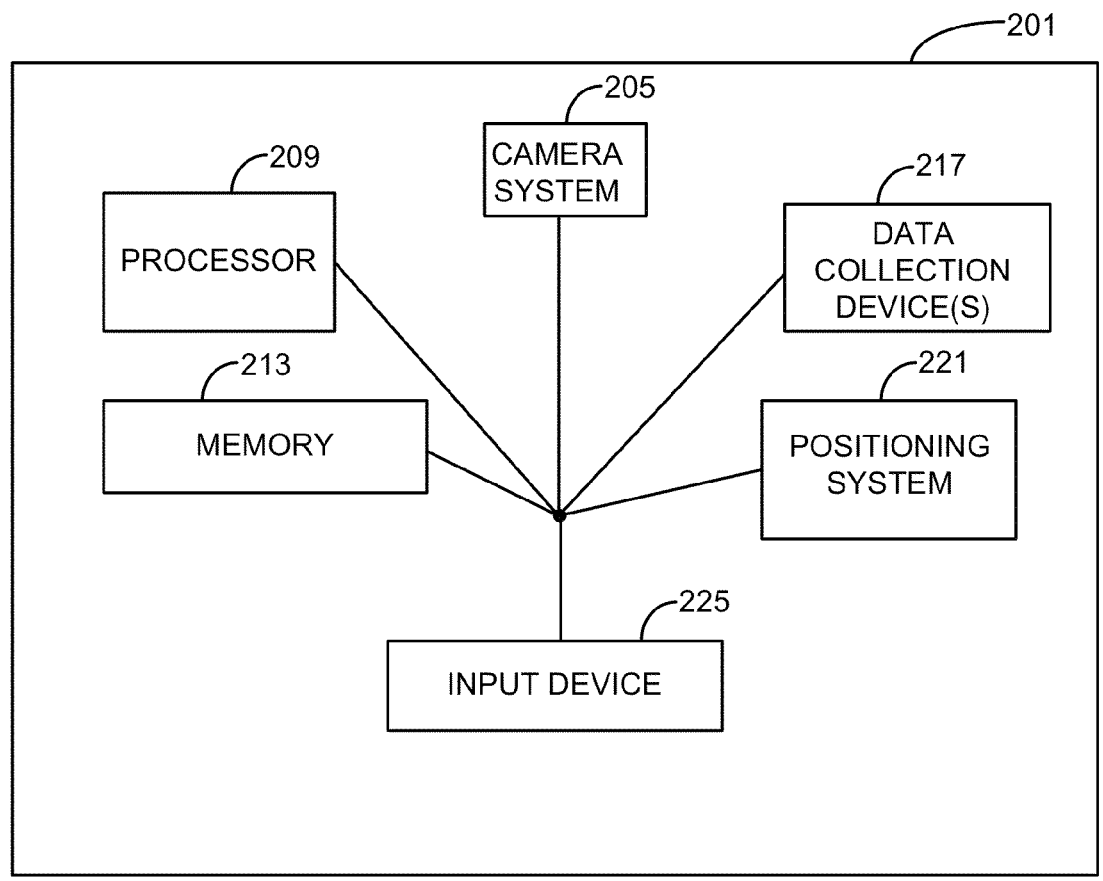
FIG. 2 illustrates an embodiment of one or more devices that may be used in the system of FIG. 1.

FIG. 2 illustrates an embodiment of components of a device 201. For example, the device 201 may be an embodiment of the object 108 (such as a vehicle), an embodiment of the supporting device 112, or combinations thereof. In one embodiment, the device 201 includes, but is not limited to, a processor 209, a memory 213, a positioning system 221, data collection device(s) 217, one or more cameras or camera system 205, and an input device 225. Additional, fewer, or different components may be provided. For example, transmitter components, receiver components, network components, and/or other components may be provided. While the components in FIG. 2 are shown as separate from one another, one or more of these components may be combined. Also, some of the components may be provided outside of the device 201.

The processor 209 is a general processor, application-specific integrated circuit ("ASIC"), digital signal processor, field programmable gate array ("FPGA"), digital circuit, analog circuit, and/or combinations thereof. In one embodiment, the processor 209 is one or more processors operable to control and/or communicate with the various electronics and logic of the device 201. The memory 213 is any known or future storage device. The memory 213 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 213 may be part of the processor 209. The memory 213 is operable or configured to store image data, video data, and/or other data, such as collected data.

The processor 209 or other processor is configured or adapted to execute data collection applications or other applications, which may be stored in the memory 213 or other memory. For example, the processor 209 communicates with the other components in the device 201 and manages collection of the various data, such as image and/or video data. For example, synchronization (such as with location data) and storage processes may be executed by the processor 209 or other processors.

The positioning system 221 is one or more Global Positioning System ("GPS") devices, one or more mechanical and/or electrical sensors, one or more gyroscopes, a local positioning system, one or more direction sensors, or other system or device(s) used for providing position data, such as location data (e.g., longitude, latitude, and/or altitude or any other coordinates) and/or direction data, of the device 201 and/or components thereof.

The camera system 205 is one or more cameras used for taking pictures and/or videos of a surrounding area. For example, the camera system 205 includes one or more video cameras that record video data (such as in the visible light spectrum) representing geographic and/or man-made features of and about a road or path as the device 201 (such as the object 108 and/or the device 112) moves along a road, a path, or an open area. The camera system 205 may also capture still photographs separate from the video data (and/or video data may be used to provide still photographs or images). The camera system 205 is able to capture different colors and associated text of different features. In one embodiment, multiple cameras face different directions. For example, one or more forward facing cameras, one or more right side facing cameras, one or more left side facing cameras, and one or more backward facing cameras relative to the device 201 (such as a vehicle or harness) are provided. In one embodiment, four, six, eight, or any number of cameras are provided. In addition to or instead of static position cameras, one or more rotating cameras may also be provided. For example, a camera (such as a panoramic camera) that rotates 360 degrees or less may be provided, such as to collect multiple image frames. Some or all of the cameras may be fitted with wide-angle lenses (such as a fisheye lens) that provide angle of views that are greater than the human eye, such as to capture panoramic images and/or video.

The data collection device(s) 217 may include one or more light data collection devices or other data collection devices. For example the device or system 217 may include one or more light sources and one or more light receivers. In one embodiment, the data collection device 217 is a Light Detection and Ranging ("LIDAR") device or sensor, a laser device, and/or other device that collects data points, such as three-dimensional data, by transmitting and receiving light. For example, the data collection device 217 is a LIDAR device that uses one or more lasers to collect data points representing a surrounding area, such as an area about a road or path or other area. The LIDAR device collects and gathers data points in a point cloud, such as a three dimensional ("3D") point cloud, in which each data point corresponds to a local coordinate, such as (x, y, z). The one or more lasers may be in a near infrared spectrum (such as about 700 nm to about 5000 nm or about 800 nm to about 2500 nm) or other light spectrum. In one embodiment, the LIDAR device is a 64 element LIDAR sensor HDL-64E from Velodyne, Inc., located in Morgan Hill, Calif. and/or a LMS200 series LIDAR sensor from SICK AG, located in Waldkirch, Germany.

The input device 225 may be one or more buttons, keypad, keyboard, mouse, stylist pen, trackball, rocker switch, touch pad, voice recognition circuit, or other device or component for controlling or inputting data in one or more of the components of the device 201.

Referring back to FIG. 1, the collected data may be stored on one or more computer-readable media 116, such as a CD-ROM, DVD, flash drive, hard drive, or other non-transitory tangible media suitable to store data. Alternatively, the media 116 may be signals carrying or having data. Separate media 116 may be used to store separate or different types of data. In one embodiment, photographs (such as digital or electronic photographs), video images, LIDAR or laser data, location data, and/or other geographic data collected by the object 108 and/or the device 112 are stored in one or more media 116. The collected image/video data may represent areas or regions about or around a path, road, or other area. For example, the collected image or video data may include geographic features, such as sky features, terrain or surrounding features, roads or paths (such as sidewalks), road or path markings (such as cross-walks or lane markings), road or path signs, points-of-interest ("POIs") such as buildings, parks, museums, etc., and/or other man-made and/or natural features or objects.

The collected image data and/or other collected data are sent, such as via one or more media 116, to a map, geographic, and/or navigation data developer 118, such as NAVTEQ North America, LLC located in Chicago, Ill. For example, a medium 116 may be mailed to or brought to the map developer 118. Alternatively, some or all of the collected data may be transmitted to the map developer 118 via a wireless and/or wired network. For example, the network may include the Internet, an intranet, a local area network ("LAN"), a wide area network ("WAN"), a virtual private network ("VPN"), a server network, a cellular network, a satellite network, a broadcasting network, a wireless or wired connection, and/or any known or future network or connection. The term "map developer" may also include third-party contractors.

The processing device 120, maintained by the map developer 118, receives the collected data. For example, the processing device 120 is one or more servers, computers (such as a desktop tower or a laptop processing unit), processors, and/or other electronic processing systems or devices. The processing device 120 includes, but is not limited to, a processor 140, a memory 144, and an image software application 150. Additional, fewer, or different components may be provided.

The processing device 120 may include or be in communication with one or more of the workstations or computers 124. For example, the workstation 124 is a user interface, electronic console, and/or computer with one or more input devices that may be used to access, control, and/or communicate with the processing device 120 or components thereof.

The processor 140 is similar to or different than the processor 209, and the memory is similar to or different than the memory 213. The processor 140 is configured or adapted to execute the image software application 150, which may be stored in the memory 144 or other memory. For example, the memory 144 stores the received collected data, such as collected images/video and/or location/position data. The application 150 takes the stored images and/or video and creates image views based on commands and management of the processor 140.

Figure 3:
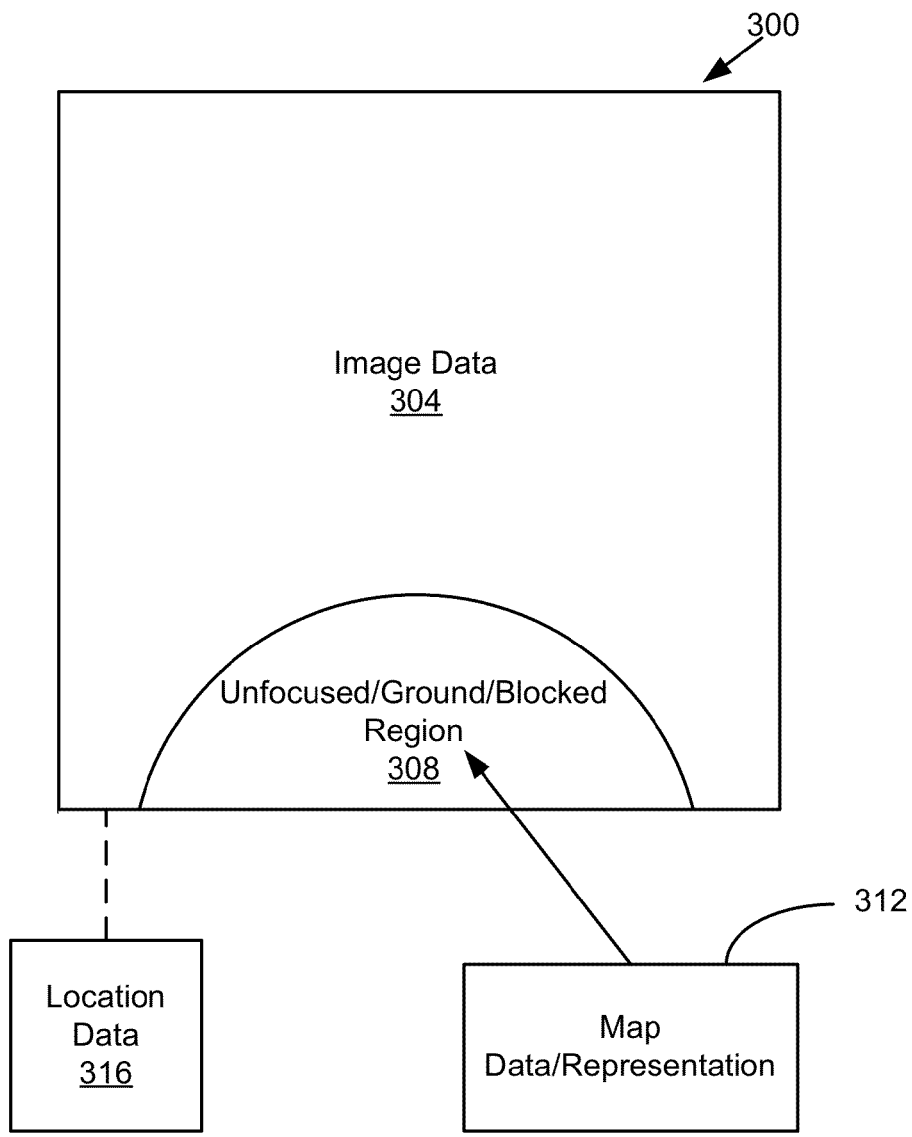
FIG. 3 illustrates components of an image view and/or associated processing, such as used in the system of FIG. 1.

FIG. 3 illustrates an embodiment of an image view 300. For example, received images and/or video is processed to form or generate the image view 300, such as a photo image view and/or a panoramic image view. The image view 300 includes, but is not limited to, an image data section 304 and a region 308. The region 308 is positioned at a bottom area of the region 304, but the region 308 may be positioned at or correspond to other locations within region 304. The image data region 304 corresponds to one or more images or image scenes, such as panoramic imagery. For example, image data collected and received are processed or transformed to generate panoramic views, such as street views or other geographical or area views. The image data and/or imagery views may be pixilated raster data in a bitmap, JPEG, GIF, and/or other image format. In one embodiment, omnidirectional images ("ODIs") are converted to panoramic or perspective images, such as by using known and future techniques. Images or image data may be stitched together or processed to provide panoramic or perspective views, such as seamless imagery that has an angle-of-view that covers about or at least more than 160 degrees or 180 degrees from a reference point (such as from a horizontal and/or vertical plane).

The region 308 may correspond to a ground area or region associated with the image data section 304. Also, the region 308 may correspond to an unfocused or blurry region of the image data 304. For example, when stitching images or processing images to create panoramic views (such as when converting omnidirectional image data), lower image quality occurs at the bottom or the top of panoramas, causing a blurry or unfocused effect. Also, the nature of collecting imagery or video while moving (such as collecting images/video via camera(s) on a vehicle) may result in portions of images to be unfocused, blurred, and/or blocked due to the position of the camera(s) as well as the angle of view of the lenses. In another embodiment, the region 308 may correspond to a blocked region, such as a portion of the object 108 (such as a vehicle) may be blocking the road or other geographic/area feature. For example, when a camera is mounted on a vehicle for collection purposes, the top of the vehicle or other parts of the vehicle may get in the way on the images/video. Alternatively, the region 308 may correspond to any other area represented by the image data 304.

Accordingly, to utilize the unfocused, blurry, and/or blocked region 308, the application 150 may link and/or integrate map data or a map data model or representation 312 with the region 308. For example, the map data 312 may correspond to a digital interactive map model or representation corresponding to the image data 304. The map data 312 or representations thereof may be processed or retrieved from the processing device 120 (such as part of the received collected data) and/or may be retrieved from the database 128. The data associations between the image data 304 and the map data 312 are made. Also, location data 316, such as GPS data collected, that corresponds to the location(s) of the image view 300 and/or the associated map data 312 are linked or associated with the image view 300. The processing to generate one or more image views 300 and the associated map, location data, and/or other connections/links may be automated and/or may include manual editing or processing, such as via the workstation 124.

Referring back to FIG. 1, after one or more image views 300, associated map data 312 or links thereof, and/or other links are generated, they or portions/components thereof are stored in the database 128 or other database. Other collected or processed data, such as geographic/area data, may also be stored in the database 128 or other database. The database 128 is a navigation, map, and/or geographic database and may include one or more specific or categorized databases. For example, the database 128 includes an image database 132 and a map database 136. More, fewer, or different components may be provided.

In one embodiment, one or more processed or generated image/video views 154, such as the image view 300, are stored in the image database 132. The image view data 154 may include image data files that correspond to composite or stitched images that represent panoramic image/video views. Alternatively, raw, preprocessed, and/or other image/video data may be stored in the image database 132. Also, static map data that are integrated within image views 154 may be stored in the image database 132 as part of the same data file. Also, links, IDs, or data associations that associate map data or map representations with specific image views may be part of the image view data 154, may be stored in the indexes 158, or may be stored somewhere else, such as in the map database 136 or other database. The indexes 158 may be one or more look-up tables, organization charts, links or association files or IDs, and/or any index data files that associates different data or data files.

The map database 136 may be part of or separate from the image database 132. In one embodiment, the map database 136 includes data used for navigation-related and/or geographic-related services. For example, the geographic/map database 136 contains road segment/link data records 162 and node data records 166 that represent a road network, such as the path network 104. A node represents an end point of a road segment and/or intersection points (e.g., a segment is associated with two nodes, one at each respective endpoint). The road segments and/or nodes may be associated with attributes, such as geographic coordinates, street names, address ranges, speed limits, turn restrictions at intersections, and other vehicle navigation attributes, as well as POI data records 170, such as gasoline stations, hotels, restaurants, museums, stadiums, offices or objects therein, automobile dealerships, auto repair shops, landmarks, indoor points/features/structures, buildings, stores, etc. Alternatively or additionally, the map database 136 contains path segment/link and node data records or other data that represent pedestrian paths and/or indoor areas in addition to or instead of vehicle road record data. Also, the map database 136 may include other map data records 174 as well as one or more indexes 178 to link, associate, and/or organize different types of data. The index records 178 may be similar to or different than the index records 158. The map data records may be generated or created and/or updated based on the collected geographic data (such as data collected by the object 108 or device 112, data in the media 116, and/or data processed or received by the device 120) or other collected, gathered, and/or acquired data.

Further description and details on node data records, segment data records, and/or other navigation data records or associated data may be provided in the U.S. Pat. No. 6,038,559, entitled SEGMENT AGGREGATION IN A GEOGRAPHIC DATABASE AND METHODS FOR USE THEREOF IN A NAVIGATION APPLICATION, which is hereby incorporated by reference.

The map database 136 and/or the database 128 or data thereof may be a master geographic/map database that is stored in a format that facilitates updating, maintenance, and development. For example, the master geographic/map database or data in the master geographic/map database is in an Oracle spatial format, such as for development or production purposes. The Oracle spatial format or development/production database may be compiled into a delivery format, such as a GDF format.

The data in the production and/or delivery formats may be compiled or further compiled to form one or more geographic/map database products or databases 184, which may be used in end user navigation devices or systems or other systems or devices. The products 184 may include both map data and image data, or the map data may be provided separately from the image/video data. Also, any corresponding link or association data between images/video and map data or other data may be provided in the product 184 or other product. For example, a customer of the map developer 118 (such as a developer of navigation devices or systems, a software application provider, a data content provider, Internet services provider, or other entity) may receive generated image views (such as the image view 300) and/or associated data as well as other data (such as map data) in a delivery format and then compile and/or configure such data for end user devices or end user services. Or, the map developer 118 may do the compiling. In one embodiment, geographic, location, map, and/or image data is compiled (such as into a PSF format) to organize and/or configure the data (e.g., segment/link, node, image/video views, and/or other data or attributes) for performing navigation-related functions and/or services such as route calculation, route guidance, map display, image/video display, speed calculation, distance and travel time functions, and other functions, by a navigation device or other electronic device or system. The navigation-related functions may correspond to vehicle navigation, pedestrian navigation, or other types of navigation as well as geographic/map features and services. In an alternative embodiment, raw collected image data is sent from the map developer 118 to another entity, and the other entity processes the image data to generate the image views, such as the image view 300 or various street views or other views. The other entity may associate and/or integrate map data or map representations with the image views.

Figure 4:
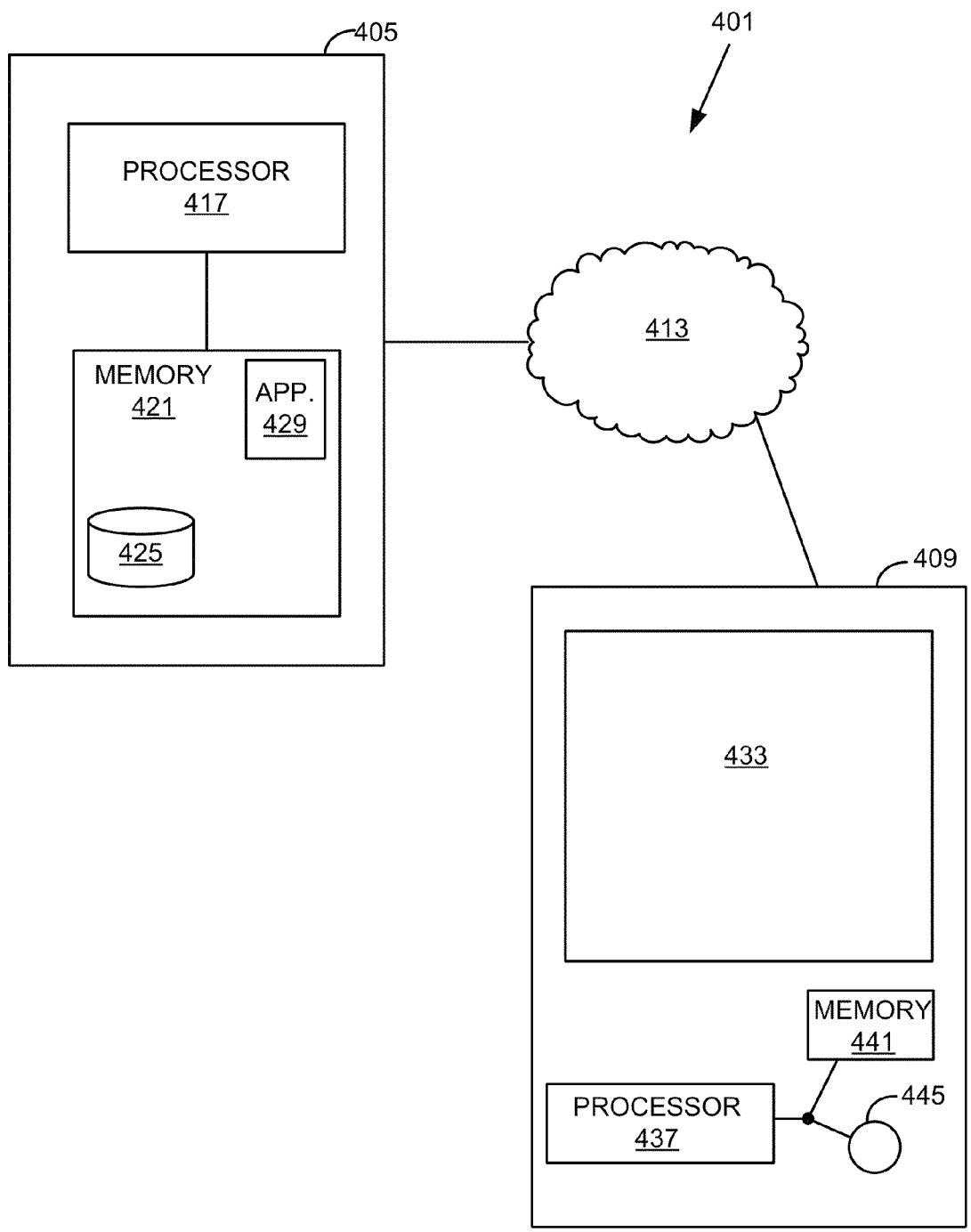
FIG. 4 illustrates an exemplary communication system and/or devices thereof related to the system of FIG. 1 or products thereof.

FIG. 4 illustrates an exemplary communication system 401. The system 401 includes, but is not limited to, a device 405, a network 413, and a user device 409. More, fewer, or different components may be provided. In one embodiment, the device 405 is a server or other data processing/providing device (e.g., a server maintained by the map developer 118 or other entity). The server 405 includes a processor 417 and a memory 421. More, fewer, or different components may be provided. For example, other hardware and/or software features commonly associated with a server may be provided.

The processor 417 is similar to or different than the processor 209 or 140, and the memory 421 is similar to or different than the memory 213 or 144. The processor 417 is configured or adapted to control and/or communicate with other components, such as the memory 421. The memory 421 includes a database 425 and a software application 429. The application 429 may be part of or communicates with a services application that provides map and/or navigation related services, such as image/video and map display. The database 425 may be similar to the database 128, the database 132, the database 136, and/or the database 184. The server 405 (via the processor 417, the memory 421, the application 429, and/or other components) uses the database 425 or other databases to provide image/video views, such as the image view 300, to requesting users or clients, such as via the network 413.

The network 413 may include the Internet, an intranet, a local area network ("LAN"), a wide area network ("WAN"), a virtual private network ("VPN"), a server network, a cellular network, a satellite network, a broadcasting network, a wireless or wired connection, and/or any known or future network or connection and/or components thereof. The user or client device 409 is in communication with the server 405 via the network 413.

The user device 409 is configured to provide map, navigation, image, video, and/or geographic related functions or features. For example, the user device 409 is a desktop computer, a laptop computer, a digital tablet, a cellular telephone, a mobile phone, a personal digital assistant ("PDA"), an in-vehicle navigation system, a personal navigation device ("PND"), a portable navigation device, a watch, a camera (or device that includes camera components), and/or other device or computer. The user device 409 includes, but is not limited to, a display 433, a processor 437, a memory 441, and one or more input devices 445. More, fewer, or different components may be provided. For example, transmitter and/or receiver components, audio components, and/or camera components may be provided.

In one embodiment, an end user uses the device 409 to view one or more image/video views, such as the image view 300 or other image views, like different street views or streetside views. The processor 437 is similar to or different than the processor 209, 140, or 417, and the memory 441 is similar to or different than the memory 213, 144, or 421. The processor 437 is configured or adapted to control and/or communicate with other components, such as the memory 441, the display 433, and/or the input device 445, which is similar to or different than the input device 225. The processor 437 processes received data from the server 405 to provide features on the display 433, such as photo and/or panoramic image views including imagery representations as well as map representations. Alternatively, the device 409 does not communicate with the server 405 to retrieve data to display some or all maps and/or images, and, instead, the device 409 includes a database, such as the database 425 or portions thereof, stored in a memory, like the memory 441, to retrieve such data.

The display 433 is any mechanical and/or electronic display positioned for accessible viewing in, on, or in communication with the device 409. For example, the display 433 is a touch screen, liquid crystal display ("LCD"), cathode ray tube ("CRT") display, a light emitting diode ("LED") display, a plasma display, and/or other display. The display 433 may act as a hardware and/or software implementation of a user interface or a portion thereof.

Figure 5:
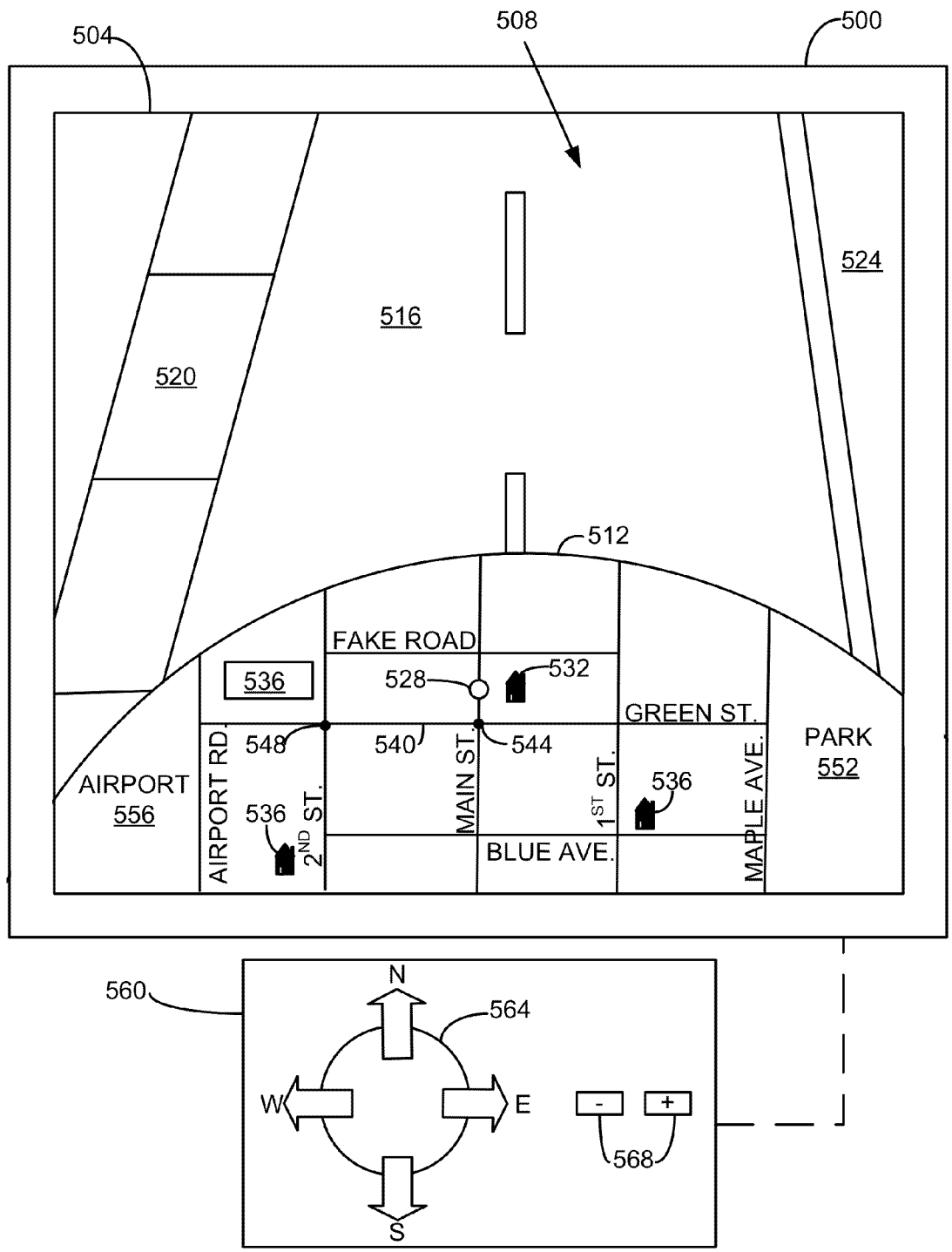
FIG. 5 illustrates a graphics user interface on a device, such as a device in the system of FIG. 4.

FIG. 5 illustrates a graphics user interface 504 on a device 500. The device 500 may be similar to or different than the device 409. The graphics user interface 504 may be a software implementation and/or hardware implementation of a display, such as the display 433. For example, a photo and/or panoramic image view 508 is displayed. The image view may be similar to or correspond to the image view 300.

In one embodiment, the photo image view 508 includes an image representation 516 that represents a street or road, an image representation 520 that represents a sidewalk or other path, an image representation 524 that represents a building or other POI, and/or other image representations or portions thereof. The image representations may correspond to the image data section 304.

The photo image view 508 also includes a map or map widget 512. The map 512 corresponds to the region 308. In one embodiment, the map 512 is an interactive digital map that corresponds to the geographic location of the image(s) displayed. Alternatively, the map 512 is a static map. The map 512 represents the area around the present location that is displayed as photo imagery. For example, the icon 528 represents the point in the map where one is viewing the images of the real world, such as the image representations 516, 520, and 524. The icon 528 may be a point, a circle, an arrow, or any other shape. For example, the road image 516 corresponds to the view of Main St. from the location of icon 528 in a north direction. Also, the POI 532 corresponds to the image representation 524. The map 512 includes a graphical model of roads (such as Fake Rd., Green St., Blue Ave., Airport Rd., $2^{nd}$ St., Main St., $1^{st}$ St., Maple Ave, and/or other roads or paths), POIs (such as an airport 556, a park 552, the building 532, and other POIs 536), and other geographic or map features. For example, the map 512 is not photo/video imagery data but is a vector-based, tile-based, or other type of graphical map model or representation. For example, the roads in the map 512 are displayed based on map data, such as a road segment 540 and corresponding nodes 544 and 548, that are created by a map developer, such as the map developer 118. Graphical representations of the map are generated and/or displayed based on such map data.

A control input 560 may also be included. For example, the control input is a software and/or hardware implementation. In one embodiment, the control input 560 is displayed over the photo image view 508 and/or is displayed in a separate window. The control input 560 includes, but is not limited to, a direction compass 564 and zoom buttons 568. More, fewer, or different components or features may be provided. For example, a user is able to pan the photo image view 508 left or right, back or forward, and/or in any other direction using the compass 564 and may zoom in or zoom out using the zoom buttons 568 (such as via an electronic mouse or one's finger in regards to a touch screen). Or, the compass 564 and/or the zoom buttons 568 may not be used in the case where one can use a touch screen to move about or zoom or use electronic mouse commands for the same effect.

In one embodiment, the map 512 is integrated with the photo imagery and is part of the photo image view 508. For example, if a user pans upwards, less and less of the map 512 will be displayed, and there is a point where if the user pans upwards enough, the map 512 will be entirely hidden. Accordingly, the map 512 moves as the photo imagery is moved. If the photo imagery is rotated, then the map 512 is rotated as if it is part of the photo imagery. For example, if the photo imagery of the image view 508 is rotated to place the image representation 524 in front of the users point of view, then the map 512 will integrally rotate to show the POI icon 532 north of the icon 528 (also, other parts of the map 512 may be exposed that were not exposed via the display prior to rotation). Alternatively, the rotation or movement in the photo imagery section of the image view 508 may be independent to rotation or movement in the map 512.

The map 512 may be zoomed in on or zoomed out from without causing any change in the photo imagery section of the image view 508. Alternatively, zooming operations in the map 512 may cause similar or associated zooming in or zooming out in the photo imagery section. Also, causing different image views to be displayed from different locations, such as moving forward in the photo imagery, causes the map 512 to change. For example, a user may want to view the photo imagery down the street from where the current photo image view is located, and so the user navigates forward in the photo imagery. Such an action causes the icon 528 to move forward, such as to the intersection of Fake Rd. and Main St., and sections of the map 512 that were not shown now may be shown (for example, the next street or area that is north of Fake Rd.). Also, the opposite may apply. For example, if the icon 528 is moved in the map, such as to the intersection of Fake Rd. and Main St., or the intersection of Fake Rd. and Main St. is selected, the photo image view displayed is changed to correspond to the new location.

The map 512 may also provide other navigation-related functions. For example, the map 512 may provide routing to different places in the map 512 including a display of a generated route. Also, turn-by-turn directions may be provided in visual (including text) and/or audio formats. Also, POI searching or any other searches may be provided to find something in the map. Alternatively, the map 512 may be a static map that only provides for a visual map display.

Only a portion of the photo imagery of the photo image view 508 may be displayed at a given time based on the dimensions, size, and/or shape of the display or graphics user interface 504 of the device 500. For example, when one views the photo image view 508 via the graphics users interface 504 at a given time, one may see photo imagery of the photo image view 508. The photo imagery may be one or more panoramic images or any other type of image. For example, the photo imagery including image representations 516, 520, and/or 524 may be a panoramic image. The panoramic image may be a photo image with an elongated field of view, such as a field of view greater than the human eye from a respective point. For example, the field of view may be at least or greater than 180 degrees (such as in the horizontal direction) or may be about or greater than 160 degrees in the horizontal direction and 75 degrees in the vertical direction, and/or the panoramic image may have an aspect ratio of about 2:1 or larger.

Figure 6:
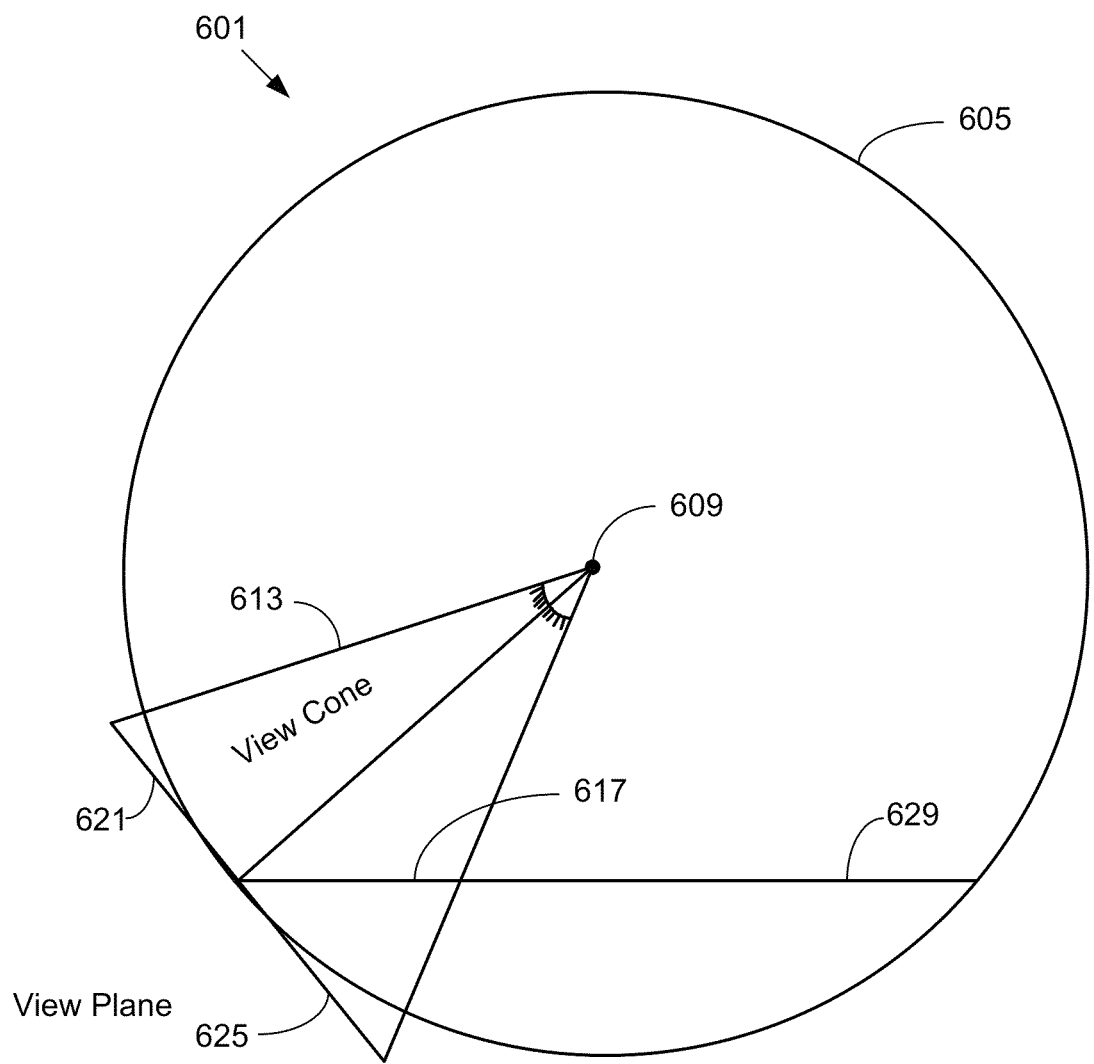
FIG. 6 illustrates a diagram regarding different views or viewpoints.

In one embodiment, the photo image view 508 including the map 512 is not limited to what is displayed or shown at one moment in time. For example, the photo image view 508 or 300 corresponds to a 360 degree spherical or bubble view in which different portions are displayed or shown at different times. Alternatively, the photo image view 508 or 300 may correspond to a view that is less than 360 degrees and/or is greater than 180 degrees. FIG. 6 illustrates a view diagram 601. For example, a point 609 represents an eye view of a user, such as what a user sees from a specific location at a specific time. The 3D bubble or sphere 605 illustrates the constraints or dimensions of a photo/panoramic image view from the specific location. The user views a view plane (made up of an image view section 621 and a map view section 625) via a view cone 613.

For example, the photo image view 508 corresponds to what the user sees based on the eye or point 609. The image view section 621 corresponds to the photo imagery representations of the photo image view 508, and the parallel map view section 625 corresponds to the map 512 of the photo image view 508. Accordingly, the map 512 or portions displayed thereof are in a perspective view that is parallel to the angle of view of the photo imagery. Alternatively, the map, such as the map 512 or portions thereof, may be displayed from a top view or a bird's eye view. For example, the portion of the map 512 that is being displayed based on the view cone 613 may be displayed in a map section 617 that corresponds to a bird's eye view vantage plane. A section 629 corresponds to the remaining or hidden parts of the map 512 from the bird's eye view point-of-view.

Accordingly, as a user views different parts of the photo image view, like the photo image view 508, the view cone 613 moves accordingly showing parts of the photo image view on the display and hiding other parts. In one embodiment, the view cone 613 may be moved upwards wherein the map portion of the photo image view is not displayed, even though it exists. The map view may correspond to the bottom half of the sphere 605. For example, the map view or map may correspond to at most the bottom 25 percent of the sphere 605. Alternatively, the map view or map may be positioned or placed in any other part of the sphere 605, such as in the top half or at most within the top 25 percent. The placement of the map view or map may be based on unfocused, blurry, or blocked regions of photo imagery data or ground regions.

Figure 7:
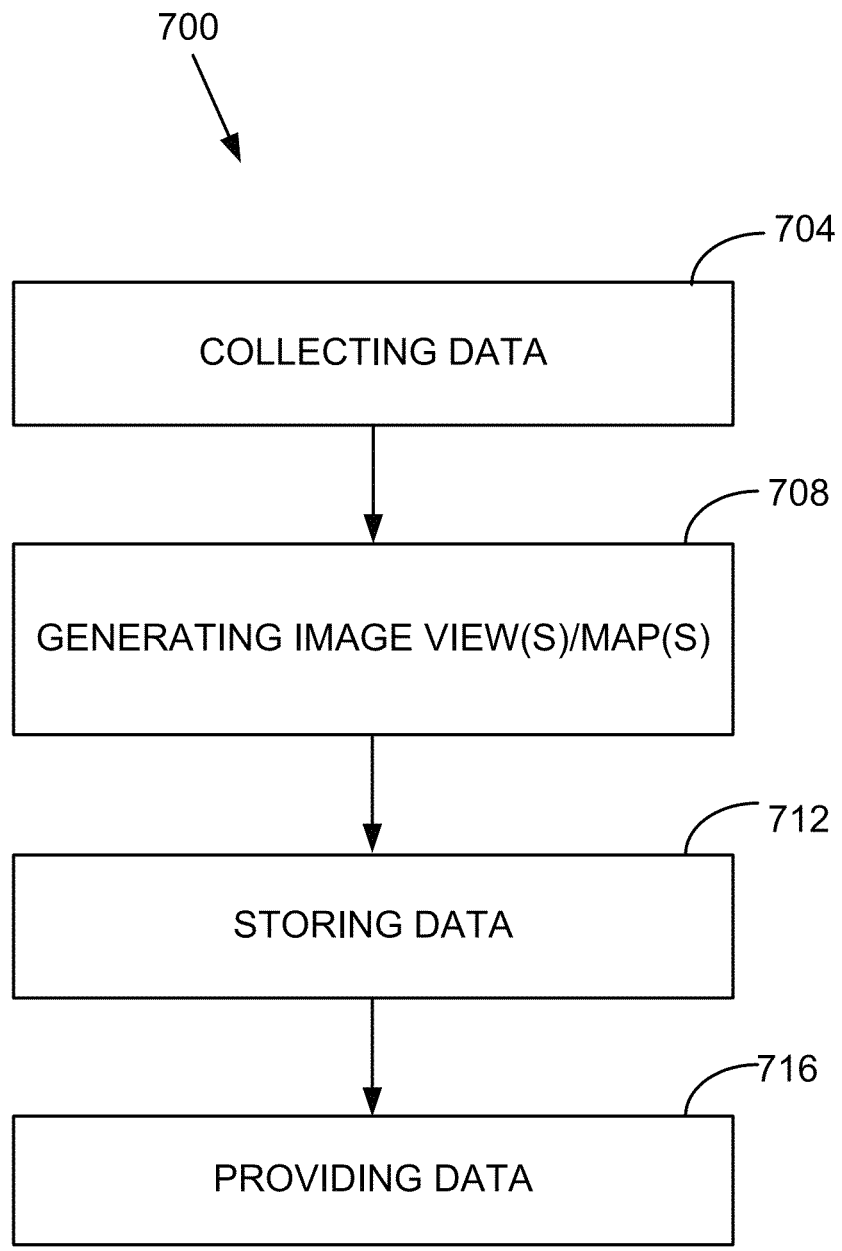
FIG. 7 is a flowchart of an exemplary method of generating data for a map, geographic, and/or navigation device or system.

FIG. 7 is a flowchart of an exemplary method 700 of generating and/or providing map, geographic, image, and/or navigation data. Fewer, more, or different steps or acts may be provided, and a combination of steps may be provided. Also, the steps or acts may be performed in the order as shown or in a different order. The method is implemented by the system and/or devices described herein or by different devices or systems. One or more steps or processes of the method may be fully or partially automated (such as via a computer, processor, and/or algorithm).

In one embodiment, data is collected (Step 704). A map developer employs or gets people to collect geographic, image/video, and/or other data, such as via the object 108 and/or the device 112, about one or more regions or areas. For example, roads or streets are driven with a vehicle having one or more cameras to collect surrounding imagery/video, location data, and/or other geographic data. The collected data, such as data in the media 116, is sent to a map developer facility, such as the map developer 118, or equipment thereof for processing.

Composite, stitched, and/or panoramic images or other images, such as the image data 304, as well as map data, such as the map data 312, are generated or provided (Step 708). For example, collected imagery data is processed to generate (or converted to) panoramic images of geographic areas, such as panoramic street views or journey views, using known or future image processing techniques. Further description and details about stitching and/or composite images may be provided in the U.S. Pat. No. 7,688,229, entitled SYSTEM AND METHOD FOR STITCHING OF VIDEO FOR ROUTES, which is hereby incorporated by reference. These panoramic images are linked or associated with corresponding maps or map data, such as the map 512, to generate photo/panoramic image views, such as the image view 300 or 508. In one embodiment, the map widget or map representation is integrated within the photo imagery, such as from the display point-of-view (as opposed to being in a separate window and/or just hovering over the photo imagery). The map may be placed or integrated in any portion of the photo imagery. For example, the map may be placed in a region corresponding to a fuzzy, unfocused, blurry, or blocked region (e.g., an unfocused, blurry, or blocked region is completely covered by the map, and/or the map only covers an unfocused, blurry, or blocked area in the imagery). Or, the map may be placed in a region corresponding to a ground area (e.g., the map is integrated in only area(s) that correspond to a ground in the imagery) or other area, such as a sky area.

The processed data, such as generated photo image views and/or data or data links thereof are stored (Step 712). For example, camera image data and map data that correspond to a photo image view, such as the photo image view 300 or 508, may be stored together in one or more data files. Or, the photo image data may be stored separately from the map data, and the links or data associations that tie the specific photo image data to specific map data or representation(s) may be stored. The data is stored using known or future storing techniques in one or more databases, such as the database 128, 132, 136, and/or 184. Then the generated, stored, and/or processed data corresponding to the photo/panoramic image views (including map data and/or links to map data) are sent or provided to other entities, such as end user applications/devices or geographic/map/navigation service/device providers (Step 716). In one embodiment, some or all of the data may be hosted on a server, such as the server 405, and/or provided in end user devices, such as the device 409.

Figure 8:
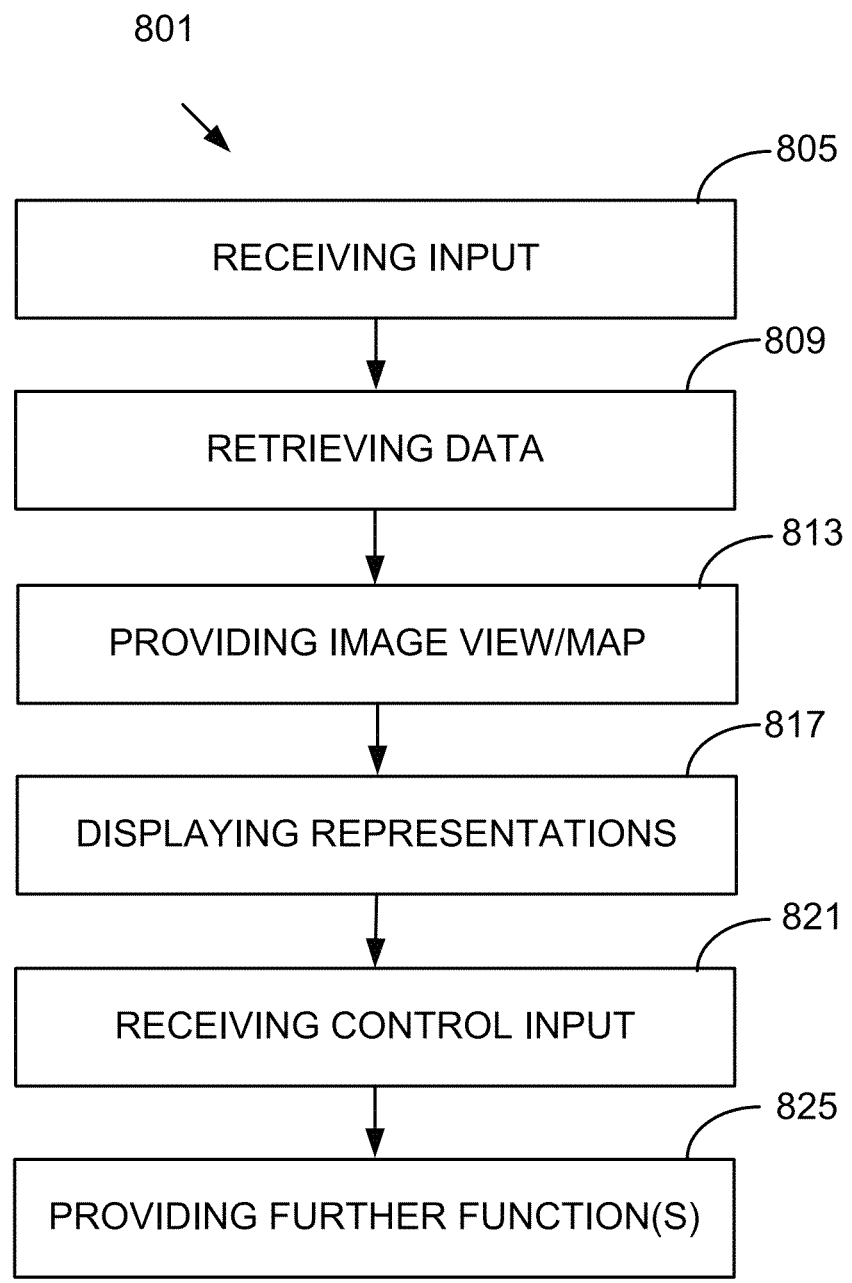
FIG. 8 is a flowchart of an exemplary method of operating a map, geographic, and/or navigation device or system.

FIG. 8 is a flowchart of an exemplary method 801 of operating a user device, such as the device 409 or 500, or application thereof. Fewer, more, or different steps or acts may be provided, and a combination of steps may be provided. Also, the steps or acts may be performed in the order as shown or in a different order. The method is implemented by the system and/or devices described herein or by different devices or systems. One or more steps or processes of the method may be fully or partially automated (such as via a computer, processor, and/or algorithm).

In one embodiment, a user turns on his or her computer, digital phone, or other device and goes to an Internet site or opens an application. The user is able to view geographic scenes, such as real world image street views. The user enters or inputs location information, such as an address or a name of a city or street (or, an area or location is clicked on). The computer, phone, or other device, such as the device 409 or 500, receives the user entered input (Step 805). Based on the input, the device retrieves data of one or more photo image views corresponding to the input (Step 809). For example, data of the photo image view 508 (including image data 516, 520, and 524 as well as map 512) is retrieved from a remote database, such as the database 425, or from data stored on the user device. One or more photo/panoramic image views and/or data thereof are provided to the user device, such as for display (Step 813). For example, the photo image view 508 is displayed to the user (Step 817).

The user is able to interact with the photo image view. For example, the user zooms in on or out from, rotates, pans, and/or navigates within the map portion or imagery portion of the photo image view. The user device or application thereof receives control input based on the user's selected actions (Step 821). Based on the control input, the display is changed to correspond to the user's selection(s). For example, the integrated map widget rotates or pans with the rotation of the imagery portion of the panoramic image view. A user or viewer icon, such as the icon 528, may be provided in the map section and change or move based on user selection and/or different navigation within the imagery or map. The map section may be zoomed in on or zoomed out from independently from the imagery section of the photo image view. Different features or functions of the photo image view discussed herein may also be provided. Alternatively, the map section may be a static map that is not interactive.

Other or further functions via the photo image view and/or application thereof may be provided (Step 825). For example, navigation routing from an origin point to a destination point may be provided, such as using known or future routing techniques (e.g., a Dijkstra method, an A-star algorithm or search, and/or other route exploration or calculation algorithms may be used). For example, the map section may be a navigable map that includes navigation-related functions including route calculation and map guidance. A generated route may be displayed on or over the map section to assist a user. Turn-by-turn routing directions may be provided in visual and/or audio format.

For example, a video showing the way from one point to another point may be provided (such as a preview or demonstration), and while the different photo imagery of different photo image views are being presented as a video, the map section may show a moving icon (corresponding to the movement of the photo images) along roads or paths in the map. Other navigation or geographic related functions, such as POI searching functions, may be provided. For example, if a POI or area of interest is searched for, the map section may highlight that POI or area within the map widget. Further description and details about navigation-related functions may be provided in the U.S. Pat. No. 6,278,942, entitled METHOD AND SYSTEM FOR PROVIDING ROUTING GUIDANCE, which is hereby incorporated by reference.

The features, components, devices, systems, acts, steps, and/or processes mentioned herein may be mixed and matched to provide other systems and/or methods embodying the idea(s) disclosed.

Alternatives

Figure 9:
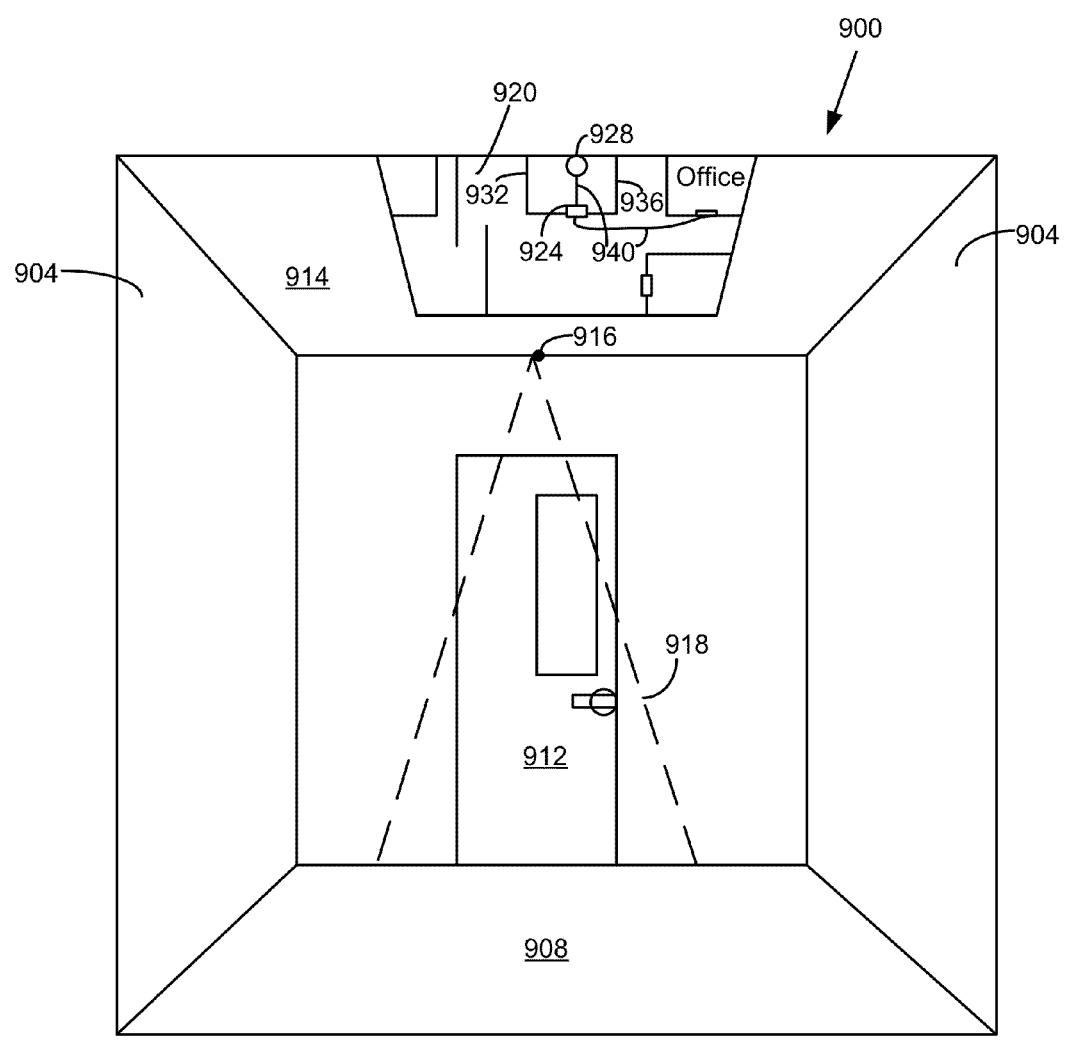
FIG. 9 illustrates an exemplary image view via a graphics user interface, such as the graphics user interface of FIG. 5.

The embodiments of the photo/panoramic image view focus on a street view or outdoor view. One or more generated photo image views may be indoor panoramic/photo image views. FIG. 9 illustrates an indoor photo image view 900, such as via a graphics user interface, like the graphics user interface 504. The indoor photo image view 900 may have similar or different functions/features as the photo image view 508.

In one embodiment, the image view 900 includes a photo imagery section including image representations 904 (representing walls of a corridor in an indoor facility), an image representation 908 (representing a building floor), an image representation 914 (representing an indoor ceiling), an image representation 912 (representing a door), and/or other image representations. The image representations are part of indoor photo imagery collected and processed, such as the image data 304 or imagery of the photo image view 508. A map or map widget 920 (which may be similar to the map 512) is provided as an integral part of the photo imagery. The map 920 is a layout map or a floor plan of the indoor space and is provided in the ceiling 914. The map 920 is provided in the ceiling so as not to disturb any floor features or other features in the photo imagery. The map 920 may be provided in other parts of the photo imagery, such as based on the different considerations mentioned herein. Alternatively, the map 920 may be provided independent of the photo/video imagery, such as in a separate window. The photo imagery may be panoramic imagery or other types of imagery. The map 920 may be a node/segment map, an open area map, or other map. Further description and details about open area maps may be provided in the United States Patent Application Publication, U.S. 2010/0023250, entitled OPEN AREA MAPS, which is hereby incorporated by reference.

In one embodiment, the integration and/or relationship between the map and the imagery is similar to the diagram 601. For example, an icon or point 928 represents a location where the user is viewing the imagery, and an icon 924 corresponds to the door 912. A wall representation 936 corresponds to the right side wall 904, and a wall representation 932 corresponds to the left side wall 904. Accordingly, the map or floor plan 920 is represented as a top mirror view. The map 920 may be displayed from a parallel perspective view relative to the imagery view point or may be displayed from a straight up view (or, alternatively, from a bird's eye view (a straight down view)).

The photo image view 900 (including the map 920 and the photo imagery) may include or provide similar features or functions as the photo image 508, such as movement, rotation, panning, zooming, interactive functions, navigation-related functions (such as routing and/or route display), map display functions, search functions, and/or other functions. In one embodiment, using the map 920, a route from the position 928 to an office is generated, and a route representation(s) 940 is provided for guidance purposes. Also, a control input, such as the control input 560, or other control input features may be used. Method steps or features similar to those described herein for generating, providing, and/or using one or more photo image views, such as the methods 700 and/or 801, may apply and correspond to the indoor photo image view 900. For example, indoor location or area input is received, and photo image data and map data corresponding to the indoor location or area is retrieved to display and enable an indoor photo image view, such as the image view 900.

In one embodiment, virtual lighting may be used to highlight an object presented in the photo imagery. For example, if a user selects the door 912 or 924 (or a route is generated through the door 912 or 924), a virtual overhead light 916 provides lighting or highlighting 918 on, above, over, and/or by the image representation 912. Accordingly, such a virtual light acts as guidance for the user in the photo imagery section of the panoramic image view 900. The virtual lighting or light(s) may be provided from any other direction or point in the image view 900.

The logic, data, software, or instructions for implementing the systems, processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts, steps, or tasks illustrated in the figures or described herein are executed in response to one or more sets of logic or computer-executable instructions stored in or on computer readable storage media (such as non-transitory media). The functions, acts or tasks may be independent of the particular type of instructions set, storage media, processor or processing strategy and may be performed by software, hardware, integrated circuits, firmware, micro code and the like, operating alone or in combination. Likewise, processing strategies may include multiprocessing, multi-tasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

It is intended that the foregoing detailed description be regarded as illustrative rather than limiting and that it is understood that the following claims including all equivalents are intended to define the scope of the invention.

I claim:

1. A computer-implemented method of providing navigation-related functions including a map display, the method comprising:

receiving input corresponding to a geographic location;

retrieving photo image data associated with the geographic location, the photo image data based on at least one image captured by a video camera or a photo camera;
providing the photo image data to display at least a portion of a photo image view representing at least a portion of the geographic location;
retrieving geographic map data corresponding to the geographic location; and
providing the geographic map data to display at least a portion of a digital map in the portion of the photo image view, wherein the digital map is integrated within the photo image view,
wherein the photo image view comprises a panoramic 360 degree view around a geographical point.

2. The method of claim 1, wherein the digital map is integrated in a region corresponding to a ground or floor.

3. The method of claim 1, wherein the digital map is integrated in an area associated with a blurred or unfocused region.

4. The method of claim 1, wherein the digital map is a graphical model of at least a portion of the geographical location generated from the geographic map data.

5. The method of claim 4, wherein the geographic map data includes road segment data records.

6. The method of claim 1, wherein the digital map is a graphical model of at least a portion of the geographical location from a bird's eye view or a perspective view.

7. The method of claim 6, wherein the perspective view is parallel to a view plane of imagery of the photo image view.

8. A non-transitory computer-readable medium configured to store a computer program that performs a method of operating a navigation system, the method comprising:
receiving input indicating an area;
obtaining photo image data associated with the area, the photo image data based on at least one image captured by a video camera or a photo camera;
displaying at least a portion of a photo image view representing at least a portion of the area based on the obtained photo image data, wherein the photo image view comprises a street view or an indoor view;
obtaining map data corresponding to the area; and
displaying at least a portion of a digital map as a function of the obtained map data, the digital map integrated in the photo image view.

9. The non-transitory computer-readable medium of claim 8, wherein the photo image view comprises a panoramic view with a field of view greater than 160 degrees.

10. A non-transitory computer-readable medium configured to store a computer program that performs a method of operating a navigation system, the method comprising:
receiving input indicating an area;
obtaining photo image data associated with the area, the photo image data based on at least one image captured by a video camera or a photo camera;
displaying at least a portion of a photo image view representing at least a portion of the area based on the obtained photo image data;
obtaining map data corresponding to the area; and
displaying at least a portion of a digital map as a function of the obtained map data, the digital map integrated in the photo image view,
wherein the digital map is integrated in a region associated with a ground area, an unfocused area, or a ceiling area of the photo image view.

11. The non-transitory computer-readable medium of claim 8, wherein the digital map is configured to provide navigation-related functions including turn-by-turn routing instructions or guidance.

12. The non-transitory computer-readable medium of claim 8, wherein the digital map comprises an interactive digital map configured for panning, rotating, or zooming operations.

13. The non-transitory computer-readable medium of claim 8, wherein the digital map comprises an interactive digital map configured to change the photo image view to another photo image view by selecting a point on the interactive digital map.

14. The non-transitory computer-readable medium of claim 8, wherein the digital map rotates with imagery of the photo image view.

15. The non-transitory computer-readable medium of claim 8, wherein the digital map corresponds to an indoor floor plan.

16. A navigation system comprising:
a graphical user interface display; and
a processor in communication with the graphical user interface display, the processor configured to retrieve panoramic image data and geographic map data associated with a geographic area based on an input indicating the geographic area,
wherein at least a portion of a panoramic image view representing at least a portion of the geographic area is displayed on the graphics user interface display based on the panoramic image data provided by the processor, and wherein at least a portion of a digital map is displayed on the graphics user interface display as a function of the geographic map data provided by the processor, the digital map being integrated into the panoramic image view,
wherein the digital map includes an icon positioned at a geographic point corresponding to the panoramic image view.

17. The navigation system of claim 16, wherein the digital map is a graphical map widget representing at least a portion of the geographical area from a bird's eye viewpoint or a perspective viewpoint.

18. The navigation system of claim 16, wherein the panoramic image view comprises an interactive panoramic image view configured to be panned to expose the different portions of the panoramic image view on the graphics user interface display, wherein panning of imagery of the panoramic image view causes the integrated digital map to pan in the same direction.

19. The navigation system of claim 16, wherein the integrated digital map comprises an interactive digital map configured to be panned, and wherein panning of the interactive digital map causes imagery of the panoramic image view to pan in the same direction.

20. The navigation system of claim 16, wherein the panoramic image view comprises an interactive panoramic image view configured to be zoomed in on or zoomed out from, and wherein when imagery of the panoramic image view is zoomed in on or zoomed out from, a different panoramic image view is displayed on the graphics user interface display relative to a new geographical point corresponding to the zooming operation.

21. The non-transitory computer-readable medium of claim 8, wherein the photo image view comprises a panoramic view of at least 180 degrees around a geographical point.

22. The non-transitory computer-readable medium of claim 8, wherein the digital map includes an icon positioned at a geographic point corresponding to the panoramic image view.

23. The non-transitory computer-readable medium of claim 8, wherein the photo image view comprises an interactive panoramic image view configured to be panned to expose different portions of the photo image view.

* * * * *